Figure 1:
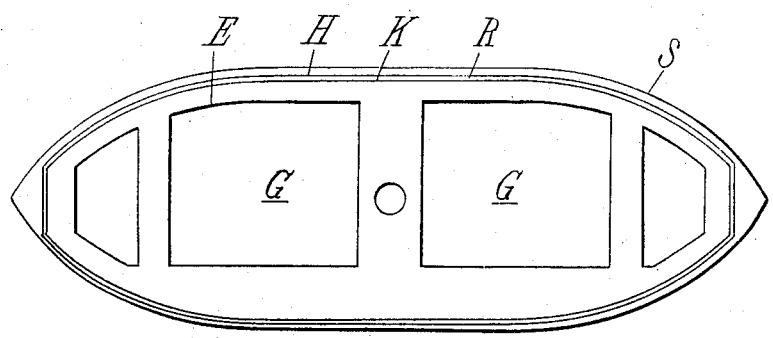

March 17, 1959  G. A. MAUNSELL  2,877,628
UNDERWATER JOINTS FOR SUBWAY SEGMENTS
Filed Sept. 6, 1955

Inventor
G. A. Maunsell

United States Patent Office 2,877,628
Patented Mar. 17, 1959

2,877,628

UNDERWATER JOINTS FOR SUBWAY SEGMENTS

Guy Anson Maunsell, London, England

Application September 6, 1955, Serial No. 532,458

Claims priority, application Great Britain September 27, 1954

1 Claim. (Cl. 61—43)

This invention relates to the formation of watertight joints between the ends of adjacent lengths of reinforced concrete precast tubular subway segments after the latter have been placed in position beneath the water of the river or estuary traversed by the subway.

This invention relates more particularly to an improved type of joint of the kind in which a metal ring or rings extending around the periphery of the meeting face of one subway segment is pressed into a mass of plastic asphalt or bituminous compound previously fixed in a recess extending round the periphery of the meeting face of the opposite segment.

According to this invention there are two peripheral rings of metal fixed around the periphery of the meeting face of one subway segment.

The rings are placed about three inches apart and project about six inches in front of the steel or concrete meeting face to or in which they are securely fastened or embedded. The outer edge of each of the projecting metal rings is preferably sharpened to a knife edge the better to penetrate the asphalt block prepared in the meeting face of the opposite subway segment.

The annular space between the rings is referred to hereafter as the slot.

In the setting of the segments by lowering from the surface the two adjacent segments abovementioned will have been laid as nearly in proper alignment level and proximity to one another as practical considerations of underwater working permit, that is to say, the relative displacement of one segment from its neighbour will not exceed three inches in any direction. The faces of abutting segments being opposite to each other an annular ring composed of rubber or the like slideably embedded in the slot on the face of one segment is forced forward in the slot by means of hydraulic pressure applied in a U-shaped rubber extension at the back of the rubber ring or by inflation of a pneumatic tube or the like means. The extruded lip of the embedded ring coming into contact with the plain face of the opposing segment deforms to some extent and makes the joint nearly watertight.

One of the two subway segments which are being joined together is already fixed in position under water the protruding end being closed by a watertight bulkhead which excludes the water from the interior of the subway.

Similarly, the new subway segment which is being floated or lowered suspended from floats into position has both its ends closed by watertight bulkheads set back a few inches inside the tubular ends.

Access shafts extending vertically from the roof of the subway provide access for men and for air at atmospheric pressure to the interiors of both the fixed and the moving subway segments.

When the meeting face of the moving segment has been floated lowered or pulled into very close proximity to the fixed subway segment, the rubber ring is first forced forward to make contact with the asphalt block so sealing off the space between the watertight bulkheads at or near the ends of the two opposing segments.

A valve provided for that purpose in the bulkhead of the fixed subway segment is then opened very quickly so allowing the water trapped in the space between the bulkheads to escape. The relief of hydrostatic pressure in the said space so effected causes the floating or suspended segment to be pushed hard up against the fixed segment. This axial force is produced by hydrostatic pressure on the outer end of the floating segment which owing to the sealing of the space and opening of the valve is unbalanced by hydrostatic pressure on the face to be joined up.

In the case of a large traffic subway laid at a depth of 50 feet below water level the axial force may amount to about 4000 tons which is more than sufficient to force the twin lines of peripheral knife edges into the annular ring of asphalt.

The hydrostatic axial force aforesaid will at the same time cause the rubber ring to be forced back into the slot from which it had originally been forced out for the purpose of making the preliminary seal.

The slot is preferably extended back a few inches behind the line of the meeting face so as to provide a recess into which the rubber ring can ultimately be forced.

According to this invention the making of a perfectly watertight joint between the opposing meeting faces is effected in the space of a few seconds after the opening of the bulkhead valve.

Referring to the accompanying diagrammatic drawings like letters refer to like things throughout.

Fig. 1 is an elevational view of a meeting face E of a reinforced concrete precast tubular segment of subaqueous subway S, which has two roadway galleries G running the entire length of the segment. Embedded in and projecting about six inches in front of the meeting face E are two steel plates H and K which extend peripherally all round near the outer edge of the meeting face E.

Between the plates H and K is a space or slot R which is of constant width.

Figure 2:
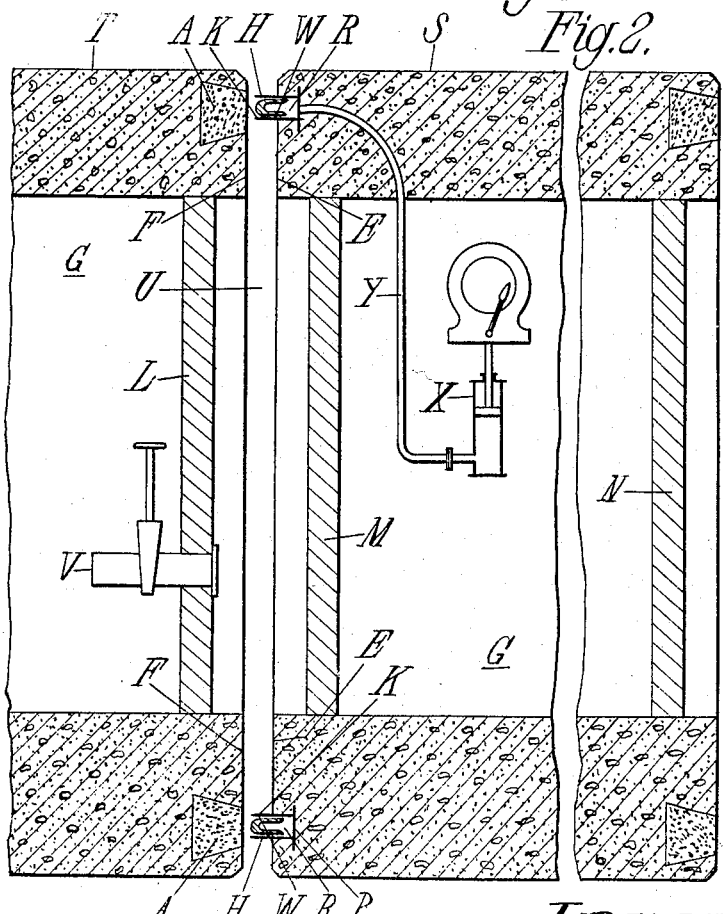

Fig. 2 shows to a larger scale than Fig. 1 a longitudinal section of two subway segments T and S depicted abutting axially upon one another with their respective meeting faces F and E a few inches apart.

Segment T is supposed to be already fixed in position underwater the end of the gallery G being closed by means of a watertight temporary bulkhead L to exclude the water. The gallery G itself is supposed to be connected at its other end or through a vertical shaft with the open air and to be filled with air at atmospheric pressure so that men can work freely inside the gallery G whilst the joint between segment T and S is being made.

Segment S is supposed to be floating under water in a horizontal position with its meeting face E abutting axially upon F. Both ends of segment S which may be 700 feet in overall length are closed by removable watertight bulkheads M and N and the interior of the gallery G being connected by means of a vertical steel shaft to the open air above men can work freely in air at atmospheric pressure in between the bulkheads M and N.

Segment S controlled by wire ropes from surface floats and moorings is manoeuvred while afloat so that the projecting edges of plates H and K come into or nearly into contact with a block of plastic asphalt A which has been cast peripherally into the meeting face F of the previously fixed segment T.

Between plates H and K in the slot R has been inserted an endless gasket ring W which fits tightly but can slide in the slot.

In the assembly of plates H and K a plate P welded to plates H and K is embedded a few inches behind the reinforced concrete meeting face E and connection is made to the slot R through apertures in plate P and a pipe or pipes Y to a water force pump X situated inside the gallery G.

Men inside gallery G admit pressure water from the pump X to the annular space at the back of slot R so forcing the preferably U-shaped rubber face gasket ring W into positive contact with the asphalt of the meeting face F.

Men inside gallery G of segment T then open valve V so permitting the water occluded in the space between bulkheads L and M to spurt into the gallery G. The amount of water which can pass through valve V depends on the amount which can leak past the peripheral joint between the gasket ring W and the meeting face F and as soon as valve V has been opened sufficiently wide to allow all leaking water to escape freely the pressure inside the occluded space U between bulkheads L and M falls to atmospheric.

The axial pressure on the remote end of the segment S and on the bulkhead N is however the hydrostatic head due to the distance below the water level which in such subways may be as much as 50 to 80 feet.

Owing to the difference of pressure on the two ends of segment S there may be a hydrostatic horizontal axial force of as much as 4000 tons tending to force the steel plates H and K into the plastic asphalt block A on meeting face F.

In a matter of seconds, therefore, from the moment of opening valve V meeting face E will be rammed tight against F and the projecting part of plates H and K will be embedded in the plastic asphalt block so forming an absolutely watertight joint between segment T and segment S. The bulkheads L and M can then be removed.

When the joint is made the slot R is filled with asphalt except for the space at the back of the slot near plate P into which the gasket ring R is forced back.

It is immaterial whether the floating segment S carry the plates or the asphalt matrix.

I claim:

A method of forming a joint between precast hollow concrete subway segments underwater which comprises positioning said segments underwater with their ends adjacent and aligned and said segments being provided with bulkheads and with means for forming a preliminary seal to enclose a space between said bulkheads, at least one of said bulkheads having a controllable valve leading from said space to the interior of the segment which is under atmospheric pressure, one of said ends having an annular ring of plastic material embedded therein and the other end having spaced-apart projecting annular plates aligned with the said plastic ring, said sealing means comprising a pliant elastic peripheral gasket ring slidingly accommodated between said spaced apart annular plates, and which method comprises applying hydraulic internal pressure to said gasket ring to cause its sliding in the space separating the annular plates to form the preliminary seal, opening the said valve to permit water to be forced from the space between the bulkheads into the segment which is under atmospheric pressure by the differential hydrostatic pressure existing between said space and the segment interior, and so as to thereby cause the segments to approach each other so that the projecting plates are forced into the ring of plastic material.

References Cited in the file of this patent

UNITED STATES PATENTS

| | | |
|---|---|---|
| 730,135 | Lake | June 2, 1903 |
| 907,356 | Hoff | Dec. 22, 1908 |
| 938,265 | Moir | Oct. 26, 1909 |
| 1,881,421 | Coyle | Oct. 11, 1932 |